Nov. 15, 1927.
L. M. BELL
1,649,013
SUSPENSION SEAT
Filed Oct. 1, 1925
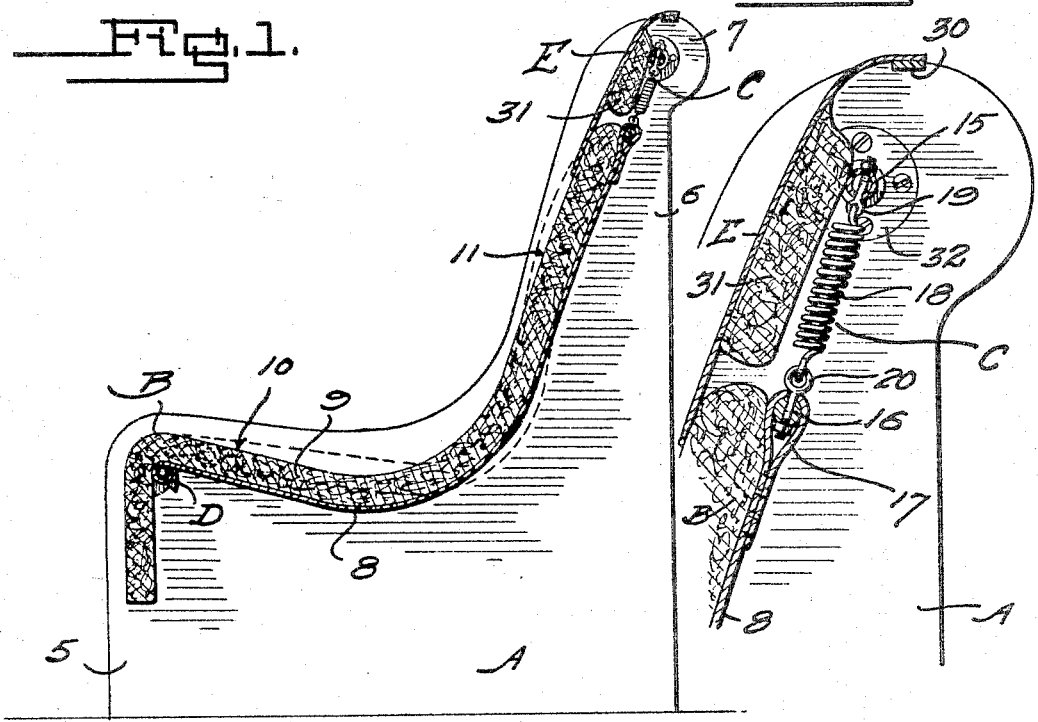
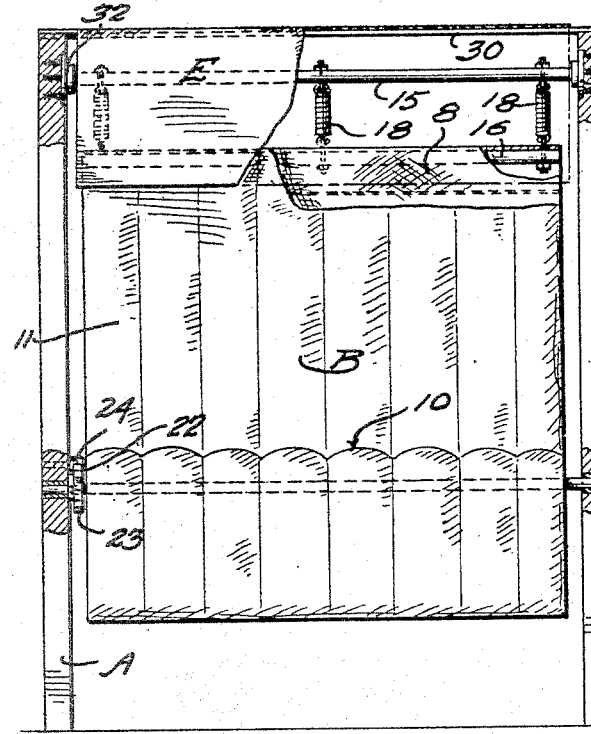
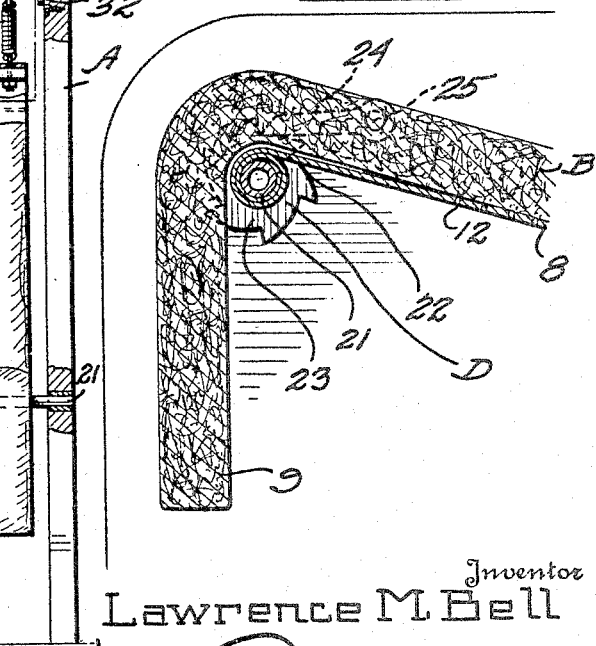
Inventor
Lawrence M. Bell
By Lancaster and Allwein
Attorneys Patented Nov. 15, 1927.

1,649,013

UNITED STATES PATENT OFFICE.

LAWRENCE M. BELL, OF MARIETTA, OHIO.

SUSPENSION SEAT.

Application filed October 1, 1925. Serial No. 59,897.

The principal object of the present invention is to provide seats, particularly well adapted for drivers or occupants of motor vehicles, or persons who remain seated for a considerable length of time, which tend to support the lower part or lumbar area of the spine of the occupant of the seat in its normal physiological position. By the use of such seats, tenseness of the back muscles is to a great degree eliminated thus enabling the occupant of the seat to relax, with a consequent conservation of energy, as when driving, or concentration of thought to any work or pleasure that may transpire.

Another object of the invention is to provide seats, particularly well adapted for use in vehicles, which eliminate the relative movement between the occupants and the back rests of the seats. Such relative movement usually prevails when the vehicle is traveling over rough roads or when striking ruts, due to the common practice of rigidly mounting the back rest relative to the vehicle frame and spring cushioning the seats. Thus it is not necessary for the driver or occupants of a motor vehicle equipped with seats, according to the present invention, to lean forward when riding is rough in order to avoid the friction and soiling of clothing which relative body and back rest movement produces.

A further object is to provide seats capable of ready adjustment to suit the desires or requirements of different persons, no matter whether stout or lean, and regardless of weight, for comfortable riding or relaxation. The adjustments permit of the person assuming either an erect or a semi-reclining posture.

Other objects are to provide seats which may be manufactured at a low cost,—considerably less than those now in common use, and which will function or aid in absorbing engine vibration and road shocks.

Further objects and advantages of the invention will appear in the following detailed description of the preferred embodiment of the invention, taken in connection with the accompanying drawings, forming a part of this specification, and in which drawings:

Figure 1 is a central vertical sectional view through the body support of a suspension seat constructed according to my present invention.

Figure 2 is a front elevation of the same, parts being broken away and parts shown in section in order to disclose details.

Figure 3 is an enlarged fragmentary vertical sectional view, disclosing more in detail resilient suspension means for the body support.

Figure 4 is a similar view disclosing more in detail adjusting means for the body support.

Broadly the seat comprises, upright side members A; a body support B of flexible material; suspension means C for the upper end portion of support B; and adjusting means D for the other end portion of support B. If desired, there may also be provided an apron E, the function of which will be set forth more fully hereinafter.

While the side members A herein disclosed are similar to those of a car seat, comprising the main body or base portion 5, a rear upstanding portion 6, and a head 7, it is to be understood that such is merely by way of example, since these side members may be of any suitable shape, and when the suspension seat is for automobile use, the side members may form a part of the vehicle body and are not necessarily separate units distinct from the other structure in which the seat is provided.

The body support B preferably comprises a flexible web-like base 8, such as fabric, and cushioning material 9 secured to the base 8, preferably in a manner more fully hereinafter set forth. The body support B includes a seat portion proper designated 10 and a back rest portion 11 merging into one another with no definite line of juncture. The cushioning material is preferably of that character that may readily yield to pressure, such as quilted upholstering or inflated rubberized material. It is understood, however, that this cushioning material may be dispensed with if it is desired to provide a comparatively inexpensive suspension seat still having desirable characteristics. The cushioning material is secured to the base 8 in any suitable manner, such as by stitching as indicated at 12, but is free of the base at the forward section of the seat portion 10 as more clearly shown in Figure 4 of the drawings, where the cushioning material is shown slightly elevated above the bast 8 to indicate that it is free of the base for a portion of its length.

In assemblage, the body support is disposed intermediate the side members A, free thereof, especially at the portion of the body support where the seat portion proper, and back rest portion merge into one another, as clearly shown in Figure 2.

The suspension means C preferably comprises a cross bar 15 secured to the head portions 7 of side supports A; a cross bar 16 secured to the upper terminal of the base 8, as by having a portion of such base material looped about the bar as indicated at 17 and a plurality of coil springs 18 having their terminal portions secured to the bars 15 and 16, as by eye bolts 19 and 20, respectively.

Referring now to the adjusting means D, such preferably comprises a drum 21 rotatably carried by the side members A and a locking device 22, which may comprise a ratchet wheel 23 secured to the drum 21, and a pawl 24, pivotally carried by the support A, as at 25, the pawl co-operating with the ratchet wheel in the well known manner. The flexible base 9 is secured to the drum 21 and may be wound thereupon, by imparting rotation to the drum in one direction, and unwound therefrom by imparting motion to the drum in a counterdirection. The drum may be moved, as by engaging a tool, not shown in the drawings, with the ratchet wheel, first releasing the pawl if the base material is to be unwound from the drum, or the cushion material may be folded back at the portion where the stitching 12 commences and the base material 8 and drum grasped in the hand in order to accomplish adjustment. It is to be observed that the cushioning material extend over the drum 21 and depends therefrom, as shown in Figure 4 thus permitting a wide range of adjustment, according to the size and weight of the persons who use the seats, and according to the desires of the person as to whether an upright posture is to be assumed or one of a semi-reclining nature.

While it is obvious that the suspension means C may be concealed, in any suitable manner, if desired, I have shown in the preferred embodiment of the invention, an apron E which extends over the suspension means and engages the front of the back rest 11. This apron may be secured to a bar 30, which in turn is secured to the heads 7 of the side members A. Suitable cushioning material 31 may be secured to the rear portion of the apron E, for engagement with the springs 18.

If desired, the cross bar 15 may be journalled in bearings 32, carried by the side members A, thus permitting the cross bar to swing, so that the eyebolts 15 are co-axial with the line of pull, when the seat is occupied, and according to the adjustment, that is, whether arranged for the occupant to assume an erect or upright position, or one of a semi-reclining nature.

The operation of the seat, in order to support the lower part or lumbar area of the spine of the occupant of the seat, in its normal physiological position, is perhaps self evident from an inspection of Figure 1 of the drawings, where, by way of example, in dotted lines, an altered position of the seat portion proper, and back rest, is shown.

Various changes in details and construction and arrangement of parts may be made without departing from the spirit or scope of my invention, but,

I claim:

1. In a suspension seat, the combination of side members, a back rest, a plurality of coil springs suspending said back rest from said side members, an apron extending in front of said coil springs and said back rest and free of the latter, and cushioning material between said apron and springs.

2. In a suspension seat, the combination of side members, a body support including a flexible web-like base and cushioning material including a seat portion and a back rest portion secured to said base, but free thereof at the forward section of the seat portion, means for securing the upper end portion of said support base to said side members, and means including a drum upon which said support base is wound for connecting the base material to said side members with the free portion of said cushioning material extending over the drum and depending therefrom.

3. A suspension seat comprising, side members, a body support comprising a flexible web-like base disposed intermediate said side members and cushioning material mounted upon and secured to said web-like base including a back rest portion in front of said web-like base and a seat portion upon said web-like base, means resiliently suspending said web-like base from said side member adjacent the upper portion of the back rest portion of the cushioning material, means securing said web-like base to said side member adjacent the front portion of the seat portion of the cushioning material, an apron carried by said side members and extending loosely over the front of and in contact with said cushioning material, and cushioning material above the cushioning material of the body support and between said apron and said resilient suspending means.

LAWRENCE M. BELL.